US005655020A

United States Patent [19]

Powers

[11] Patent Number: 5,655,020

[45] Date of Patent: Aug. 5, 1997

[54] AUTHENTICATING THE IDENTITY OF AN AUTHORIZED PERSON

[75] Inventor: Wesley Grayson Powers, London, Great Britain

[73] Assignee: Wesco Software Limited, London, United Kingdom

[21] Appl. No.: 335,751

[22] PCT Filed: May 7, 1993

[86] PCT No.: PCT/GB93/00944

§ 371 Date: Nov. 8, 1994

§ 102(e) Date: Nov. 8, 1994

[87] PCT Pub. No.: WO93/23830

PCT Pub. Date: Nov. 25, 1993

[30] Foreign Application Priority Data

| | | | |
|---|---|---|---|
| May 8, 1992 | [GB] | United Kingdom | 9209981 |
| May 14, 1992 | [GB] | United Kingdom | 9210369 |

[51] Int. Cl.$^{6}$ .......... H04L 9/32

[52] U.S. Cl. .......... 380/25; 380/24

[58] Field of Search .......... 380/24, 25

[56] References Cited

U.S. PATENT DOCUMENTS

| | | | |
|---|---|---|---|
| 3,657,521 | 4/1972 | Constable | 380/24 |
| 4,208,575 | 6/1980 | Haltof | 235/380 |
| 4,219,151 | 8/1980 | Haruki | 235/379 |
| 4,679,236 | 7/1987 | Davies | 380/23 |
| 4,742,351 | 5/1988 | Suzuki | 340/825.34 |
| 4,903,299 | 2/1990 | Lee et al. | 380/25 |
| 4,926,481 | 5/1990 | Collins | 380/25 |
| 5,222,135 | 6/1993 | Hardy et al. | 380/4 |
| 5,261,000 | 11/1993 | Hamamoto | 380/23 |

FOREIGN PATENT DOCUMENTS

| | | |
|---|---|---|
| WO 85/03785 | 8/1985 | European Pat. Off. . |
| 2 057 740 | 4/1981 | United Kingdom . |

OTHER PUBLICATIONS

International Search Report for PCT/GB93/00944, dated 20 Aug. 1993, citing the above-listed references.

*Primary Examiner*—Thomas H. Tarcza
*Assistant Examiner*—Pinchus M. Laufer
*Attorney, Agent, or Firm*—Merchant, Gould, Smith, Edell, Welter & Schmidt, P.A.

[57] ABSTRACT

A computer system and method is provided for authenticating the identity of an authorised person. The basic concept is that a permitted user of an identification article such as a credit card will be given a personal identification number with the card and will be instructed not to use the personal identification number in the form in which it has been given but only to use deliberately corrupted versions thereof. The computer system is then set up to detect whether the personal identification number offered for use is a properly corrupted version of the original personal identification number.

12 Claims, 6 Drawing Sheets

AUTHENTICATING THE IDENTITY OF AN AUTHORIZED PERSON

FIELD OF THE INVENTION

1. Field of the Invention

The present invention relates to authenticating the identity of an authorised person in connection, for example, with the use of identification articles such as credit cards and the like, and identification information such as computer passwords and the like.

2. Description of the Prior Art

Currently identification articles such as credit cards and the like are offered for use carrying the signature of a permitted user. When a transaction is to be accomplished the user offers the card and signs a transaction voucher. The salesperson or clerk compares the signature on the transaction voucher with the signature on the card and the transaction is authenticated on that basis. However, signatures are reasonably easy to forge and it is common practice for a thief to steal a person's credit card and to familiarise themselves with the signature so that when they are called upon to use the card they can forge the signature. Furthermore, credit cards are often used to purchase goods by telephone where there is no requirement for authorisation other than the billing address for the card. Credit card fraud of this nature costs the industry a substantial amount of money each year and is a severe problem. Measures which are currently implemented to inhibit credit card fraud have not had any real impact on the cost to the industry, which continues to rise.

Another type of identification article which is used is a card which has data stored on a magnetic stripe carried by the card which data can be read by a machine. These cards are used to obtain money from cash dispensing machines by inserting the card into the machine so that the data on the magnetic stripe is read by the machine and then inputting a personal identification number (PIN) using a keyboard of the machine. If the personal identification number corresponds to that which has been stored in association with the particular data read from the card, the transaction is authenticated and money is produced. This type of card can also be used in other sales transactions in addition to cash dispensing machines.

With such cards, a thief can watch a person using the card to determine the personal identification number and he can then steal the card and use that personal identification number to gain access to the card owner's funds. This facility has also inhibited more extensive use of personal identification numbers, for example to authenticate the use of ordinary credit cards at a point of sale. A thief could easily hear the personal identification number being given and then steal the credit card and use the number on a subsequent occasion. It is also possible for a thief to obtain from a cash dispensing machine a list of personal identification numbers which have been used in the machine.

An example of identification information is a password for gaining access to data in a computer. Such passwords are vunerable to interception and fraudulent use.

SUMMARY OF THE INVENTION

The present invention seeks to provide a solution to the severe difficulties associated with card and other fraud.

According to the present invention there is provided a computer system for authenticating the identity of an authorised person, the computer system comprising:

compare means operable to receive a first code comprising a plurality of characters in sequential positions identifying the authorised person and a second code comprising a plurality of characters in sequential positions obtained from an actual user and to compare the character of the first code with the characters of the second code to determine whether the second code is a corrupted version of the first code according to a predetermined corruption algorithm; and output means for producing an authentication signal if the first and second codes differ according to the predetermined corruption algorithm.

A method of authenticating an authorised person is also provided.

In one embodiment, the compare means compares each character of the second code with the character in the corresponding position of the first code to determine identity between the codes in all but a predetermined number of the character positions; and the output means produces an authentication signal if the characters of the first and second codes differ at only said predetermined number of the character positions or an invalid signal in other cases.

Preferably, the predetermined number is one - this makes the invention simple to implement yet effective against fraud.

Thus, according to a first embodiment of the present invention there is provided a computer system for authenticating the identity of an authorised person the computer system comprising:

compare means for receiving a first code comprising a plurality of characters in sequential positions identifying the authorised person and a second code comprising a plurality of characters in sequential positions obtained from an actual user and for comparing each character of the second code with the character in the corresponding position of the first code to determine identiy between the codes in all but one of the character positions; and output means for producing an authentication signal if the characters of the first and second codes differ at only one of the character positions or an invalid signal in other cases.

The first embodiment also provides a method of authenticating an authorised person comprising the steps of:

receiving a first code comprising a plurality of characters in sequential positions identifying the authorised person;

receiving a second code comprising a plurality of characters in sequential positions obtained from an actual user;

comparing the characters of the second code with the characters in corresponding positions of the first code to determine identity between the codes in all but one of the character positions; and producing an authentication signal if the characters of the first and second codes match in all but one of their character positions or an invalid signal in other cases.

In a second embodiment, the second code has more character positions than the first code and the compare means compares the characters of the second code with the characters of the first code to determine whether the second code contains a sequence of characters in the same order as the sequence in the first code. The output means produces an authentication signal if the second code contains a sequence of characters corresponding to that in the first code or an invalid signal in other cases.

In the second embodiment, the computer system can be arranged to authenticate the second code whether or not the sequential characters in the second code have different relative character positions.

The compare means can then be operable to compare each character of the second code with the character in the corresponding position of the first code and, in the case of a mismatch, compare the next character of the second code with the just compared character of the first code.

In one simple yet effective implementation, the second code has just one more character than the first code so that once a mismatch has been found, no other mismatches are tolerated in the remaining characters.

The second embodiment also provides a method of authenticating an authorised person comprising the steps of:

receiving a first code comprising a plurality of characters in sequential positions identifying the authorised person;

receiving a second code comprising a plurality of characters in sequential positions obtained from an actual user, the second code having more characters than the first code;

comparing the characters of the second code with the characters of the first code to determine whether the second code contains a sequence of characters in the same order as the sequence in the first code; and producing an authentication signal if the second code contains a sequence of characters corresponding to that in the first code or an invalid signal in other cases.

The second code can be obtained from a user in a variety of different ways. He can enter it himself via a keypad or other input device, or he can supply it verbally to an operator to enter into a computer system via a keypad or other input device.

Alternatively, the computer system can be arranged to display a plurality of character sequences to a user, only one of which has been coded according to the predetermined corruption algorithm, and the user is asked to select from this plurality by depressing a key or in some other way.

These systems are particularly appropriate for authenticating the user of an identification article when the article is offered for use in a transaction. They also provide an effective resistance to hackers attempting to seek unauthorised access to a computer system.

The concept underlying the present invention for one of its applications is that a permitted user of an identification article such as a credit card will be given a personal identification number with the card and will be instructed not to use the personal identification number in the form in which it has been given but only to use deliberately corrupted versions thereof. More specifically, in the first embodiment, a user will be instructed to deliberately alter one character in his personal identification number before he uses it. In the second embodiment, he will be instructed to deliberately add one character into his personal identification number before he uses it. The computer system is set up to recognise such deliberately corrupted versions of the personal identification number as authentic versions thereof.

Preferably, once one version of the personal identification number has been used this version is stored in the computer system and subsequent attempts to use that version within a predetermined time period result in an invalid signal being produced. This has a big advantage in deterring would-be credit card thieves since they would know that even if they perceived or heard a personal identification number being given when the credit card was used they would not be able to use that same number but would have to guess the correct personal identification number so that they could produce a different corrupted version of it. This presents would-be thieves with a serious difficulty because when the first version of the personal identification number is given they are not able to ascertain from that which digit has been altered or added so it is a matter of guess work for them to establish what the correct personal identification number was. An attempt to use an incorrect version of a personal identification number with an authentication article would naturally cause security measures to be implemented with a high probability of the thief being apprehended if a fraudulent use was attempted.

In the preferred implementation of the first embodiment, the computer system is set up to determine when all but one of the characters in the respective positions match. It can operate to ignore the excepted character once a match in all other characters has been obtained, in which case the system will recognise the correct personal identification number in addition to authentic versions thereof. To prevent the correct number from being accepted as authentic, this can be added to the .list of stored numbers which have been used. As an alternative, the computer system can determine not only that there is match in all but one of the computer positions but that there is a mismatch in the excepted character.

In the preferred implementation of the second embodiment, the computer system is set up to determine when all of the characters in the second code match characters in respective sequential positions in the first code. It can operate to ignore a mismatch in one character position provided that there is a match in all other characters in the correct sequence.

Preferably the computer system comprises first input means for receiving data derived from the identification article itself and storage means for storing a first code in association with the data derived from the identification article. The first input means can for example be a keyboard or a magnetic stripe reader. The computer system is preferably also provided with second input means by which an operator can input the second code offered by the actual user of the identification article.

In a further preferred arrangement, there can be stored with data to be derived from the identification article not only an appropriate first code but also other user data associated with the permitted user such as his address, telephone number, age, date of birth etc. With this arrangement, if an invalid version of the personal identification number is given an operator will be instructed to ask further questions about the permitted user of the card which a thief could not answer. Already at this stage the level of security has increased substantially acting as a significant deterrent to a would-be thief.

BRIEF DESCRIPTION OF THE DRAWINGS

For a better understanding of the present invention and to show how the same may be carried into effect reference will now be made by way of example to the accompanying drawings in which.

FIGS. *2a–2c* are a flow chart illustrating an authentication method of the first embodiment; and FIGS. *3a* and *3b* are a flow chart illustrating an authentication method of the second embodiment.

DESCRIPTION OF THE ILLUSTRATED EMBODIMENTS

The authentication method will firstly be described in general terms to explain the basic concept.

A retailer requests a credit card and a personal identification number from the person presenting the credit card.

The person presenting the credit card has been advised of his personal identification number and has been instructed to offer it in a deliberately corrupted form, for example with one digit deliberately changed to another value or with an extra digit added. Thus, as one example of the first embodiment, if his personal identification number is 1234 he will tell the retailer 2234 or 1254 for example. As one example of the second embodiment, for the same personal identification number 1234 he will tell the retailer 12534 or 13234 for example. The retailer enters details from the credit card into a computer system either manually or by passing the card through a magnetic stripe reader and this provides to the computer system the correct personal identification number associated with that card.

The retailer then enters the version of the personal identification number offered by the customer into the computer system and awaits an authentication or invalid signal. Alternatively, the customer enters the number himself. If the version of the personal identification number which has been offered differs from the correct personal identification number according to a predetermined corruption algorithm and if that version of the personal identification number has not already been used within a predetermined time period the computer system will indicate that the user is authenticated.

In other circumstances the computer system will produce a transaction invalid signal and this will prompt the retailer to ask further questions of the customer concerning personal details relating to the permitted user of the card.

Figure 1:
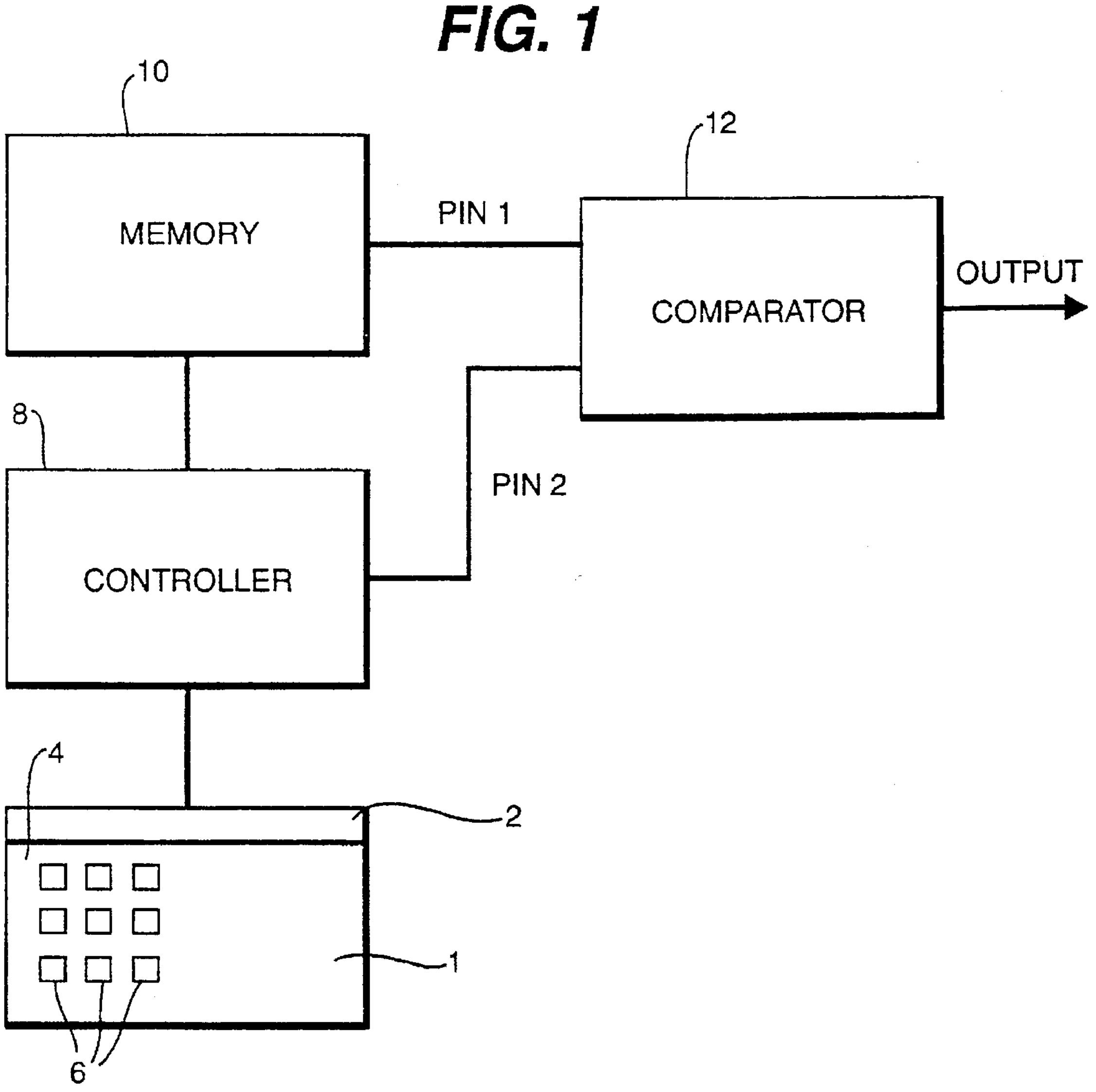
FIG. 1 is a diagram of a computer system for implementing an authentication method.

Reference is now made to FIG. 1 to describe the computer system. The computer system comprises an input device 1 which includes a magnetic stripe reader 2 for reading data from a credit card and a keyboard 4 comprising a plurality of numbered keys 6 by means of which a personal identification number can be entered. The input device 1 is connected to a controller 8 which has access to a memory 10. In the memory 10 there is stored a databank having a plurality of files, bach file being identifiable by data derived from the credit card and containing permitted user data including a personal identification number and additional user data such as the permitted user's address, telephone number, age, date of birth etc. The computer system includes a comparator 12 for receiving the user's personal identification number from the memory 10. The comparator 12 also receives via the controller 8 the identification number which is entered using the keys 6 of the input means. These are identified respectively by PIN 1 and PIN 2 in FIG. 1. The comparator produces an output signal which is either transaction authenticated or transaction invalid according to the results of the comparison of PIN 1 and PIN 2.

Figure 2A:
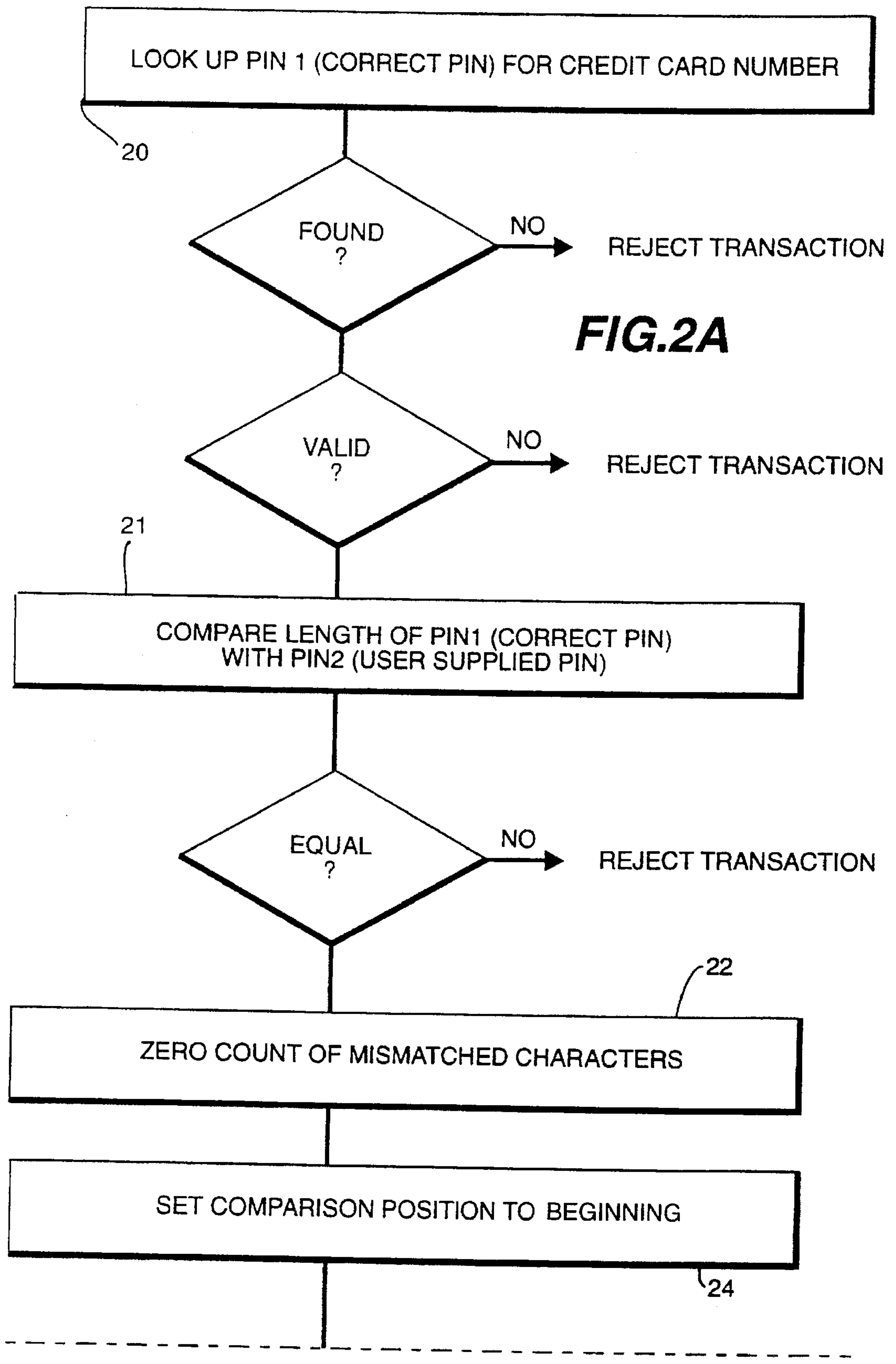
Figure 2B:
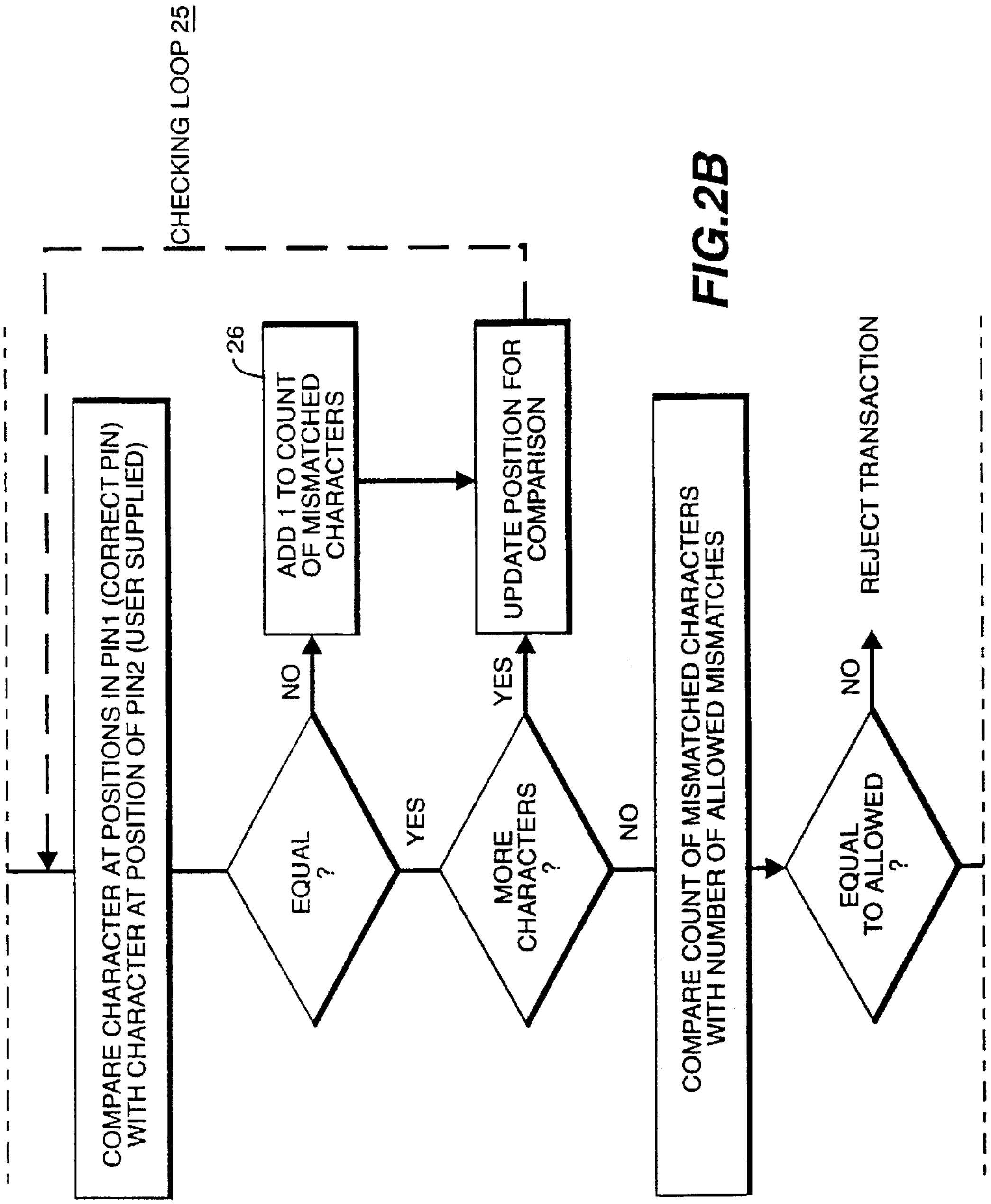
Figure 2C:
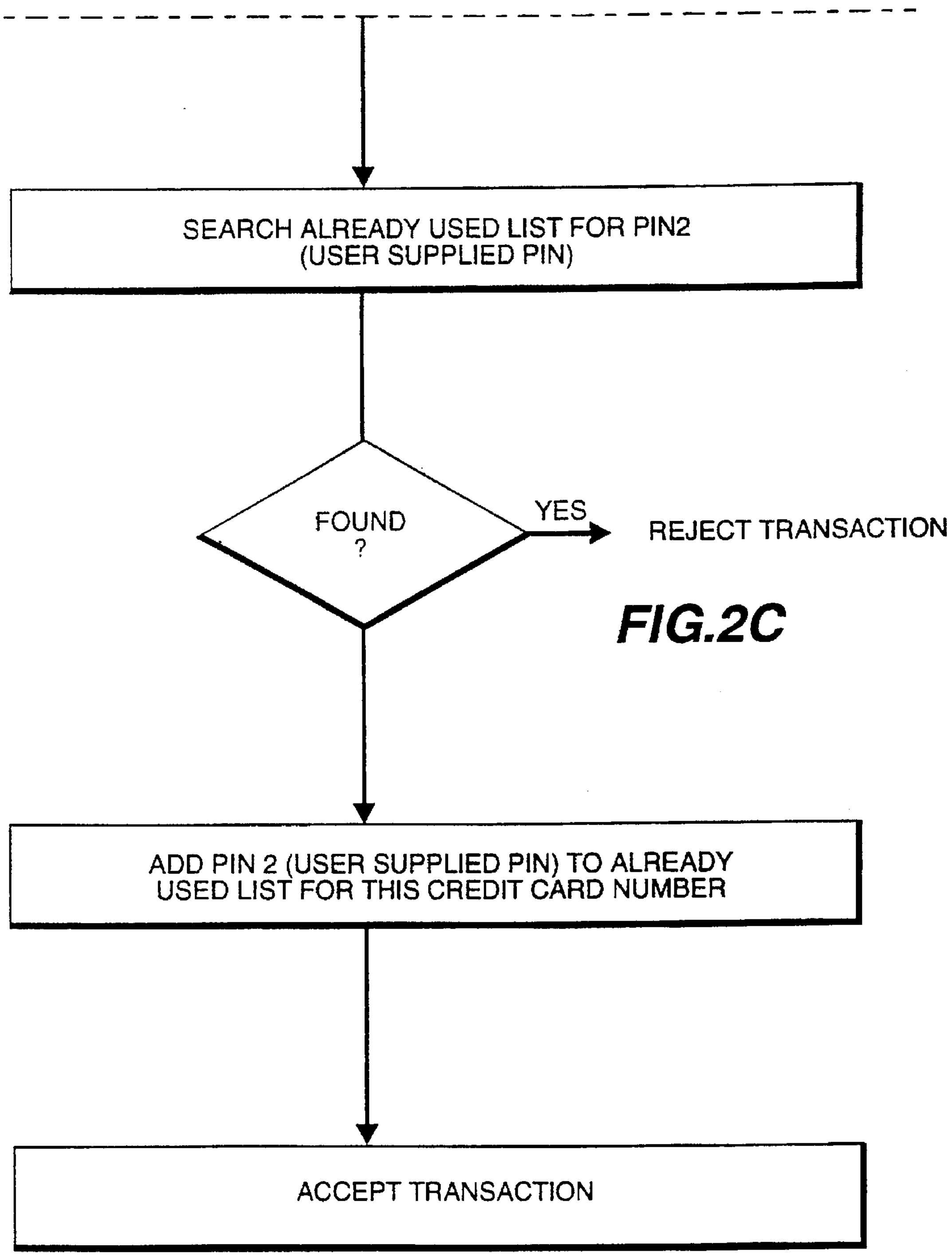

Reference will now be made to FIG. 2 to illustrate how the computer system operates in the first embodiment. In step 20 data is derived from a credit card offered for use via the magnetic stripe reader 2 and is passed to the controller 8 to cause the PIN (PIN 1) associated with the permitted user of that credit card to be located. In the circumstances that the credit card itself is rejected as being invalid (due to credit data or as a result of having already been reported stolen) or if information concerning that card is not found in the memory 10 the transaction is rejected. At step 21, the length of the PIN (PIN 2) offered by the user is compared with the authentic PIN (PIN 1) and if the number of characters is not the same the transaction is rejected. If the number is the same, the method proceeds to step 22. At step 22 the count of mismatched characters is initialised to 0. At step 24 the character position is initialised to 1, that is the first character of the stored personal identification number is compared with the first character of the personal identification number offered by the user of the credit card. If the characters are the same the method proceeds by checking the next character position to see whether there are further .characters. The next character of the stored personal identification number is then compared with the next character of the offered personal identification number. In each case if the characters are the same the checking loop 25 moves directly to check the next character and, if the characters are different, at step 26 one is added to the count of mismatched characters before the next character is checked.

When there are no more characters to be checked the stored count of mismatched characters is examined. If this count is not equal to the allowed number. e.g. if there is more than the allowed number of mismatched characters, the transaction is rejected. If the count of mismatched characters equals the allowed number the computer system then checks to see whether or not that version of the personal identification number has already been used within a predetermined time period. If it has the transaction is rejected. If it has not this version of the personal identification number is added to the store of already used personal identification numbers and the transaction is accepted. Preferably the allowed number of mismatched characters is one.

In an alternative embodiment, the checking loop operates differently. Once step 21 has been carried out to verify the length of the PIN 2, the characters of each PIN are compared in their corresponding positions to determine whether there are at least n−1 matches where n is the number of characters in each PIN. In this arrangement, the authentic PIN 1 itself would be validated but this could be rejected at the next stage by having it stored with the previously used PIN 2's for comparison.

Figure 3A:
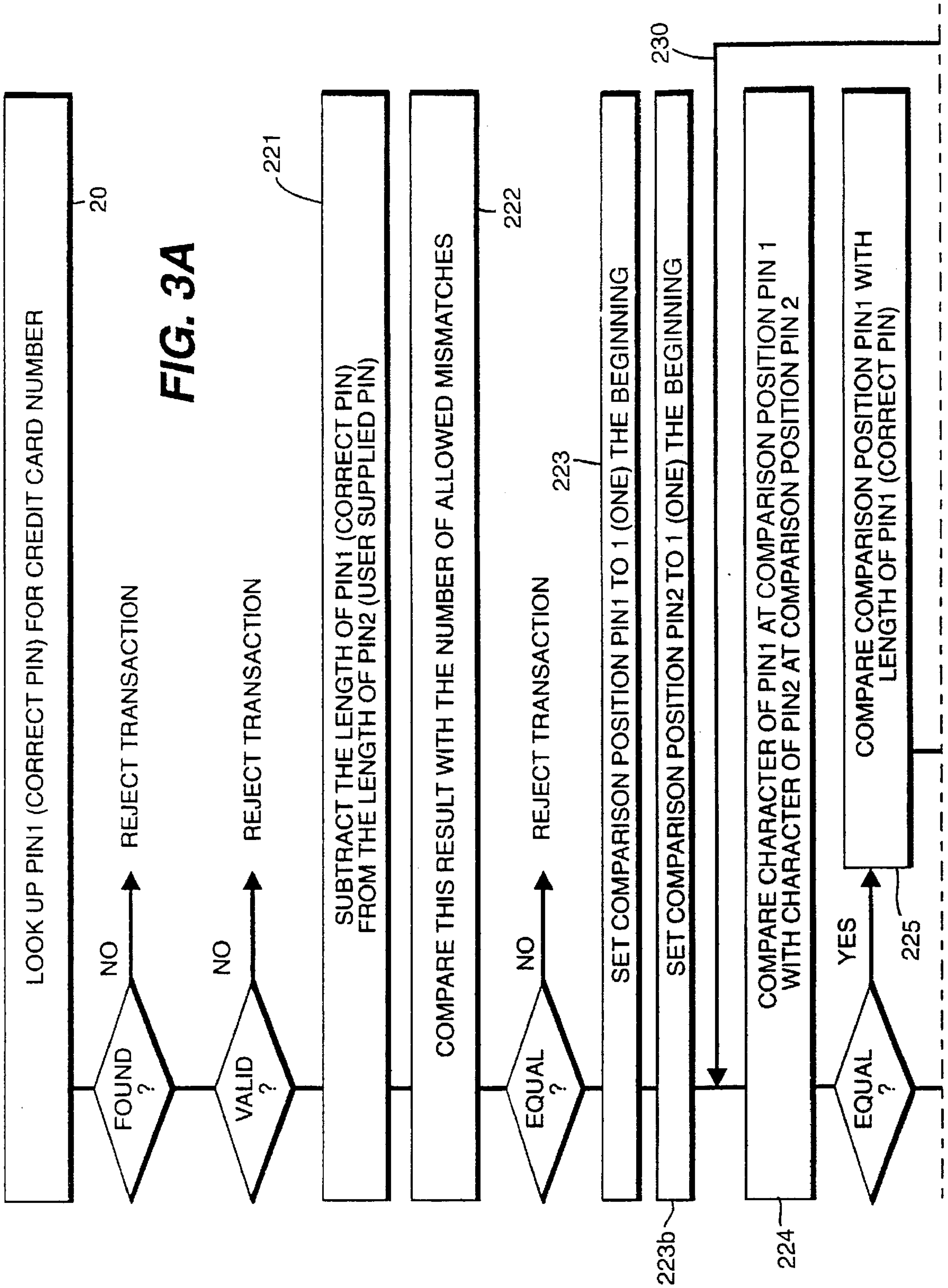
Figure 3B:
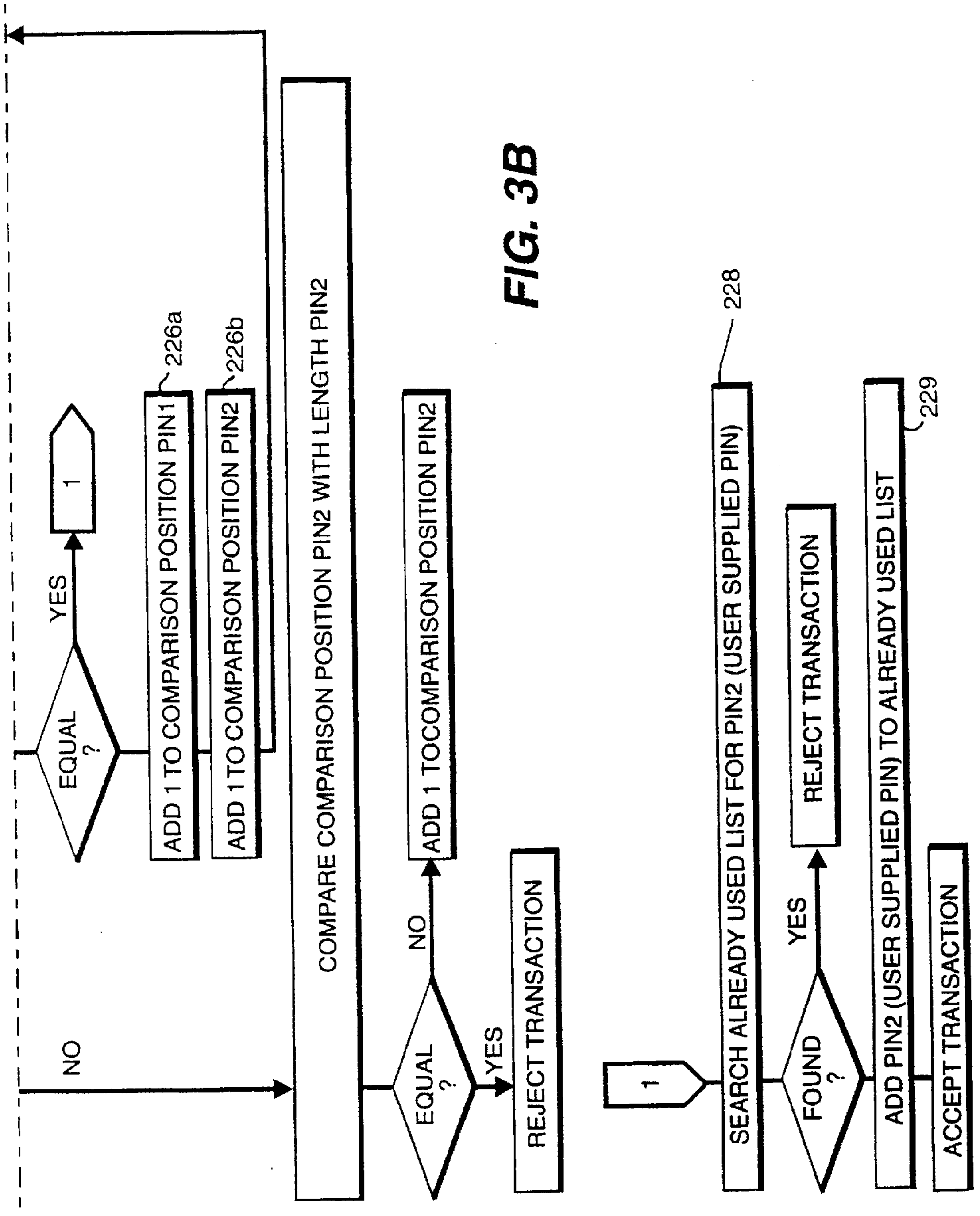

Reference will now be made to FIG. 3 to illustrate how the computer system operates according to the second embodiment. In step 20 data is derived from a credit card offered for use via the magnetic stripe reader 2 and is passed to the controller 8 to cause the PIN (PIN1) associated with the permitted user of that credit card to be located. In the circumstances that the credit card itself is rejected as being invalid (due to credit data or as a result of having already been reported stolen) or if information concerning that card is not found in the memory 10 the transaction is rejected. At step 221, the length of the authentic PIN (PIN1) is subtracted from the PIN (PIN2) offered by the user and at step 222 the result is compared with the allowed number of characters by which PIN2 can exceed PIN1. If the number of characters is not the same the transaction is rejected. If the number is the same, the method proceeds to step 223. At step 223 the comparison position is set to the first character of PIN1 and at **223*b* to the first character of PIN2. At step 224 the first character of the stored personal identification number is compared with the character in the first character position of the personal identification number offered by the user of the credit card. If the characters are the same the method proceeds by checking at step 225 the next character position to see whether there are further character positions in PIN1 to be checked. If there are, the next character of the stored personal identification number is then compared at steps 226*a* and 226*b* with the character in the next position of the offered personal identification number PIN2. In each case if the characters are the same the checking loop 230 moves directly to check the next character until there are no further character positions in PIN2 to be checked. If at step 224 the characters are not the same, the next character position of PIN2 is compared with the first character of PIN1. If there is a match, the method proceeds around the checking loop 230**. If there is a mismatch and if there are no further character positions in PIN2 to check, the transaction is rejected.

The checking loop 230 proceeds until the equality following the comparison step 225 is satisfied and provided that the transaction has not been rejected as a result of mismatch in a character. If a sequence of characters has been located in the second code (PIN2) corresponding to the first code (PIN1) the computer system then checks at step 228 to see whether or not that version of the personal identification number has already been used within a predetermined time period. If it has been used then the transaction is rejected. If it has not this version of the personal identification number is added to the store of already used personal identification numbers at step 229 and the transaction is accepted.

By operating the computer system to authenticate only deliberately corrupted versions of a personal identification number there is a far greater deterrent to a would-be thief since he would not be able to tell from a corrupted version what the correct personal identification number is. Moreover, if an attempt was made to use the corrupted version which had just been given the transaction would be rejected and security measure implemented.

It will be appreciated that the identification information can take any convenient form and in particular can be an alphanumeric string.

I claim:

1. A computer system for authenticating the identity of an authorized person, the computer system comprising:

compare means operable to receive a first code comprising a plurality of characters in sequential positions identifying the authorized person and a second code comprising a plurality of characters in sequential positions obtained from an actual user wherein the second code has more character positions than the first code and the compare means compares the characters of the second code with the characters of the first code to determine whether the second code contains a sequence of characters in the same order as the sequence in the first code; and output means operable to produce an authentication signal if the second code contains a sequence of characters corresponding to that in the first code or an invalid signal in other cases.

2. A computer system according to claim 1 which is arranged to authenticate the second code whether or not the sequential characters in the second code have different relative character positions.

3. A computer system according to claim 2 wherein the compare means is operable to compare each character of the second code with the character in the corresponding position of the first code and, in the case of a mismatch, compare the next character of the second code with the just compared character of the first code.

4. A computer system according to claim 1 which comprises first input means for receiving data derived from an identification article and storage means for storing a first code in association with the data derived from the identification article.

5. A computer system according to claim 4 wherein the first input means comprises a keyboard.

6. A computer system according to claim 4 wherein the first input means comprises a magnetic stripe reader.

7. A computer system according to claim 4 which is provided with second input means by which the second code offered by the actual user of the identification article can be input.

8. A computer system according to claim 4 wherein the storage means is also used to store with data to be derived from the identification article not only a first code but also other user data associated with the authorised user.

9. A computer system for authenticating the identity of an authorized person, the computer system comprising:

compare means operable to receive a first code comprising a plurality of characters in sequential positions identifying the authorized person and a second code comprising a plurality of characters in sequential positions obtained from an actual user and to compare the characters of the first code with the characters of the second code to determine whether the second code is a corrupted version of the first code according to a predetermined corruption algorithm;

output means for producing an authentication signal if the first and second codes differ according to the predetermined corruption algorithm;

first input means for receiving data derived from an identification article; and storage means for storing a first code in association with the data derived from the identification article, said computer system being arranged to generate a plurality of character sequences responsive to the first code, only one of which represents a properly corrupted version of the first code so that a user can select from said plurality.

10. A method of authenticating an authorized person comprising the steps of:

receiving a first code comprising a plurality of characters in sequential positions identifying the authorized person;

receiving a second code comprising a plurality of characters in sequential positions obtained from an actual user;

comparing the characters of the second code with the characters in the corresponding positions of the first code to determine identity between the codes in all but one of the character positions; and producing an authentication signal if the characters of the first and second code match in all but one of the character positions.

11. A method of authenticating an authorized person comprising steps of:

receiving a first code comprising a plurality of characters in sequential positions identifying the authorized person;

receiving a second code comprising a plurality of characters in sequential positions obtained from an actual user;

comparing the characters of the second code with the characters of the first code to determine whether the second code contains a sequence of characters in the same order as the sequence in the first code, the second code having more characters than the first code; and producing an authentication signal if the second code contains a sequence of characters corresponding to that in the first code.

12. A computer system for authenticating the identity of an authorized person, the computer system comprising:

compare means operable to receive a first code comprising a plurality of characters in sequential positions identifying the authorized person and a second code comprising a plurality of characters in sequential positions obtained from an actual user and to compare each character of the second code with the character in the corresponding position of the first code to determine identity between the codes in all but one character position; and the output means is operable to produce an authentication signal if the characters of the first and second codes differ at only one position or an invalid signal in other cases.

* * * * *